(12) United States Patent
Dry et al.

(10) Patent No.: US 6,997,505 B2
(45) Date of Patent: Feb. 14, 2006

(54) MODULAR DOOR TRIM PANEL ASSEMBLY HAVING AN INTEGRATED SEAL AND METHOD OF MANUFACTURING SAME

(75) Inventors: Alan Dry, Grosse Pointe Woods, MI (US); Sal Deangelo, Shelby Township, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/749,155

(22) Filed: Dec. 30, 2003

(65) Prior Publication Data

US 2005/0140166 A1    Jun. 30, 2005

(51) Int. Cl.
*B60J 5/00*    (2006.01)
(52) U.S. Cl. .................... 296/146.7; 296/39.1
(58) Field of Classification Search ............ 296/146.7, 296/191, 39.1, 146.1, 154
See application file for complete search history.

(56) References Cited

U.S. PATENT DOCUMENTS

| | | | | |
|---|---|---|---|---|
| 4,848,829 A | | 7/1989 | Kidd | 296/152 |
| 4,957,803 A | * | 9/1990 | Foley | 428/182 |
| 5,111,619 A | | 5/1992 | Billin et al. | 49/502 |
| 5,147,105 A | | 9/1992 | Ono et al. | 296/146 |
| 5,456,513 A | * | 10/1995 | Schmidt | 296/39.1 |
| 5,511,344 A | * | 4/1996 | Dupuy | 49/496.1 |
| 5,609,941 A | | 3/1997 | Cawthon | 428/172 |
| 5,776,509 A | * | 7/1998 | Ota et al. | 425/111 |
| 5,866,232 A | | 2/1999 | Gatzmanga | 428/122 |
| 6,119,406 A | | 9/2000 | Gulisano et al. | 49/502 |
| 6,139,088 A | * | 10/2000 | Okamoto et al. | 296/146.6 |
| 6,197,403 B1 | | 3/2001 | Brown et al. | 428/137 |
| 6,422,640 B1 | | 7/2002 | Whitehead et al. | 296/146.7 |
| 6,676,195 B1 | * | 1/2004 | Marriott et al. | 296/146.7 |
| 6,838,027 B1 | * | 1/2005 | Brodi, Jr. et al. | 264/138 |
| 2001/0030444 A1 | | 10/2001 | Whitehead et al. | 296/146.7 |
| 2002/0149236 A1 | * | 10/2002 | Tolinski | 296/216.07 |
| 2002/0182004 A1 | | 12/2002 | Bromhall et al. | 403/403 |
| 2003/0205915 A1 | * | 11/2003 | Gedritis et al. | 296/192 |

* cited by examiner

*Primary Examiner*—Patricia L. Engle
(74) *Attorney, Agent, or Firm*—Bill Panagos

(57) ABSTRACT

The present invention relates to a modular door trim panel assembly having an integrated seal for use in an automotive interior including a molded substrate having a first side defining an A-side surface visible from the interior of vehicle and a second side opposite the first side defining a B-side surface. The substrate includes a pair of side terminal edges and a lower terminal edge extending therebetween. The modular door trim panel assembly further includes at least one seal co-molded while the substrate is formed and bonded to the B-side of the substrate. The seal extends substantially parallel to the pair of side terminal edges and the lower terminal edge of the substrate and prevents the entry of moisture between the B-side of the substrate and the vehicle door. The present invention also relates to a method of molding the modular door trim panel assembly having an integrated seal.

14 Claims, 2 Drawing Sheets

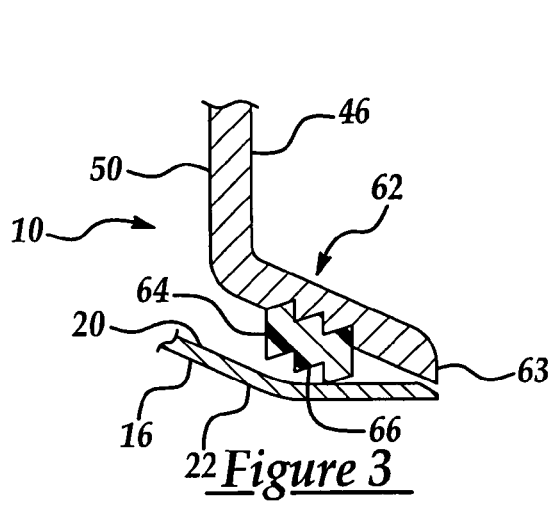
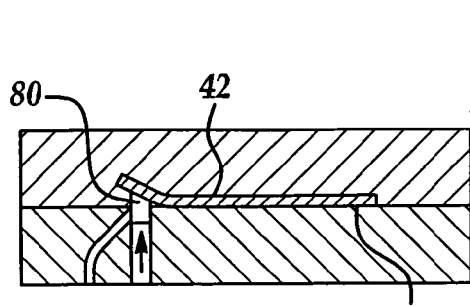
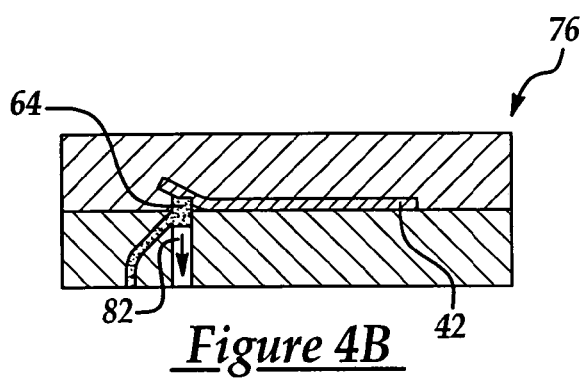
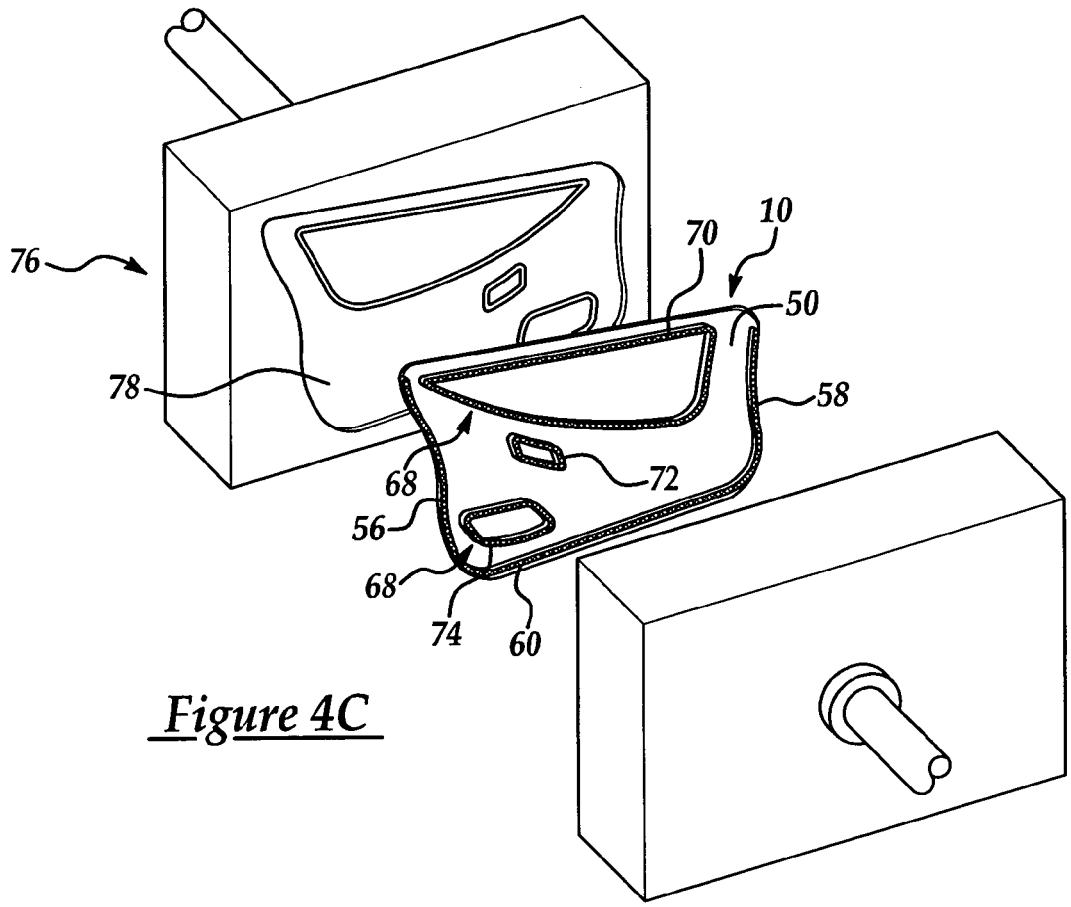

MODULAR DOOR TRIM PANEL ASSEMBLY HAVING AN INTEGRATED SEAL AND METHOD OF MANUFACTURING SAME

BACKGROUND OF THE INVENTION

1. Field of the Invention

The present invention relates, generally, to a modular door trim panel assembly for automotive vehicle interiors. More specifically, the present invention relates to a modular door trim panel having an integrated seal for use in automotive applications as well as a method of manufacturing same.

2. Description of the Related Art

Door trim panels are mounted to vehicle doors and act to conceal the internal mechanics of the door, such as a window motor, from the vehicle interior. In this way, the trim panel enhances the appearance of the vehicle interior. Door trim panels often include components that improve the ergonomics of the vehicle interior, such as a door pull, bolster, speaker and/or window/door controls. These components are located on the side of the door trim panel that is visible from the vehicle interior. This side is commonly referred to as the "A-side." The opposite side of the door trim panel includes what is commonly referred to as the "B-side." The B-side is not visible from the vehicle interior when the door trim panel is mounted to the vehicle door.

Traditionally, production of a vehicle door often includes the manufacture and assembly of various substrates, with each substrate performing a specific function. A vapor barrier is an example of one substrate that is employed to prevent moisture within the vehicle door from entering the interior of a vehicle. The door trim panel is typically the last substrate to be mounted to the vehicle door. The door trim panel includes a plurality of voids adapted to receive components that may be mounted to other substrates previously assembled to the vehicle door. In addition to the cost associated with the manufacture of each substrate, the substrates must undergo additional handling and assembly to produce a complete vehicle door. The additional handling and assembly requires an increase in the tools, machines and labor necessary to fully assemble a complete vehicle door. This correlates into increased cost associated with the vehicle door assembly process.

A number of proposals have been made in an attempt to reduce the costs associated with vehicle door assembly. One such proposal includes replacing the vapor barrier substrate with a seal that is designed to perform the same function. Typically, the seal is employed around the peripheral edge of the door trim panel where the door trim panel substantially contacts the vehicle door. This area of the trim panel is commonly referred to as the "touchdown." However, as in the case of the vapor barrier, the seal must first be manufactured in a separate mold process and then requires additional steps to assemble the seal to the door trim panel or other substrate of the vehicle door. In some instances, use of the seal may actually increase costs associated with time and labor over the cost associated with installation of the vapor barrier. Additionally, since the seal is a finished part, it is typically more costly than the traditional vapor barrier. Furthermore, the door trim panel must be adapted to mount the seal along the touchdown area. Mounting the seal to the door trim panel results in changes to the A-side of the door trim panel, thereby decreasing the aesthetic quality of the vehicle interior. Specifically, the area surrounding the touchdown area that houses the seal typically protrudes outward in a way that is visible from the A-side of the panel. This protrusion is commonly referred to as a "foot." Depending on the size of the pre-formed seal, the foot height or foot width may create a disproportionate bulge across the touchdown area on the A-side of the door trim panel, which may distract from an otherwise aesthetic and ergonomic door trim panel.

As a result, there is a need in the art for a modular trim panel having an integrated seal for automotive vehicle applications that reduces the costs associated with the production of a vehicle door. Further, there is a need in the art for a modular door trim panel having an integrated seal that reduces foot height and foot width to provide a compact profile of seal visibility on the A-side of a vehicle door trim panel to improve the aesthetic quality of a door trim panel for automotive vehicle applications. Further still, there is a need in the art for a method of manufacturing a modular trim panel having an integrated seal for automotive vehicle applications that reduces the steps necessary to assemble a seal to a vehicle door trim panel.

SUMMARY OF THE INVENTION

The present invention overcomes the disadvantages in the related art in a modular door trim panel assembly having an integrated seal for use in an automotive vehicle interior. To this end, the modular door trim panel assembly includes a molded substrate having a first side defining an A-side surface that is visible from the interior of an automotive vehicle and a second side opposite the first side that defines a B-side surface adjacent a vehicle door. The substrate includes a pair of side terminal edges and a lower terminal edge extending therebetween. The modular door trim panel assembly further includes at least one seal co-molded while the substrate is formed and bonded to the B-side of the substrate. The seal extends substantially parallel to the pair of side terminal edges and the lower terminal edge of the substrate and is adapted to prevent the entry of moisture between the B-side of the substrate and the vehicle door.

The modular door trim panel assembly is manufactured using the method of the present invention. The method includes the steps of actuating a core so as to extend into a mold cavity and partition at least one area of the mold cavity to prevent a first molten thermoplastic material from completely filling the mold cavity. Subsequently, a first molten thermoplastic material is injected into the mold cavity so as to fill the mold cavity thereby forming a rigid substrate. The core is then retracted from the mold cavity to provide at least one secondary void within the mold cavity and injecting a second molten thermoplastic material into the secondary void of the mold cavity to form at least one flexible seal bonded to at least a portion of the substrate.

Accordingly, one advantage of the present invention is that it provides a modular door trim panel that substantially reduces the need for a carrier substrate that is supported on the vehicle door and on which the door trim components are mounted.

Another advantage of the present invention is that it provides an integrated seal within a modular door trim panel that eliminates the need for a separate vapor barrier to prevent moisture within the vehicle door from entering the interior of the vehicle.

Yet another advantage of the present invention is that it provides in integrated seal having a compact profile that reduces the visibility of the seal along the A-side of a modular vehicle door trim panel, thereby improving the aesthetic quality of the trim panel.

Still another advantage of the present invention is that it provides a method of manufacturing a vehicle door trim panel that reduces the number of steps necessary to manufacture and assemble the panel to a vehicle door.

Still another advantage of the present invention is that is provides a method of manufacturing a vehicle door trim panel having an integrated seal that reduces costs associated with assembling a vehicle door trim panel by eliminating the need for a pre-formed seal.

Other objects, features, and advantages of the present invention will be readily appreciated, as the same becomes better understood, after reading the subsequent description taken in conjunction with the accompanying drawings.

BRIEF DESCRIPTION OF THE DRAWINGS

FIG. 3 is an enlarged view of the touchdown area of a modular door trim panel assembly of the present invention;

FIG. 4A is a cross-sectional in-mold view of the modular door trim panel assembly of the present invention prior to receiving an integrated seal;

FIG. 4B is a cross-sectional in-mold view of the modular door trim panel assembly in accordance with the present invention; and FIG. 4C is a perspective view of the mold and modular door trim panel assembly in accordance with the present invention.

DETAILED DESCRIPTION OF THE INVENTION

Figure 1:
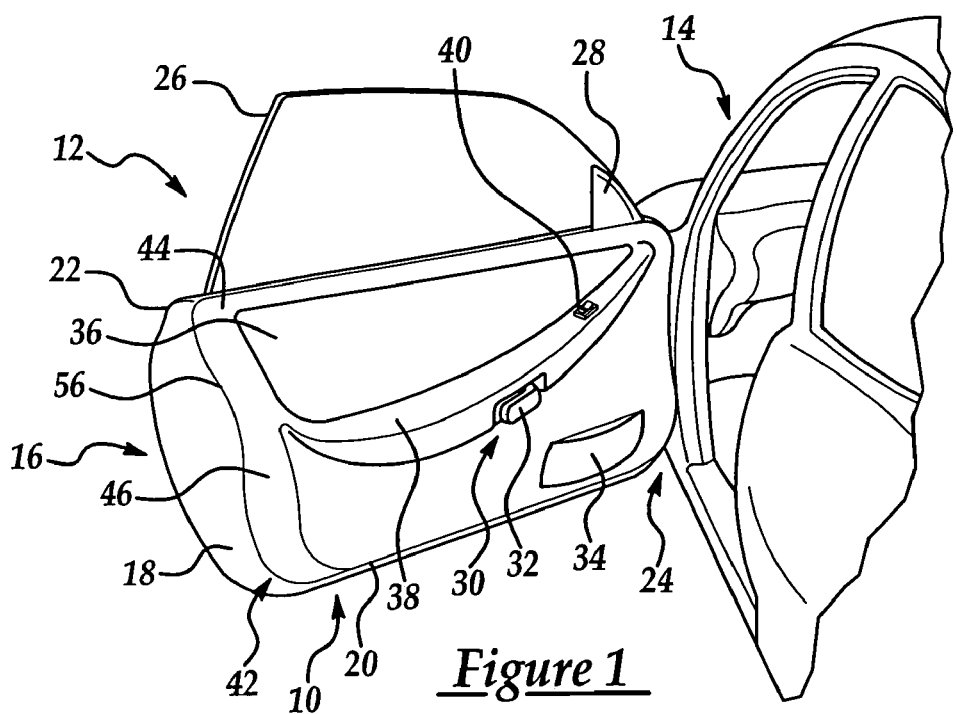
FIG. 1 is an environmental partially broken away perspective view of a vehicle including a modular door trim panel assembly of the present invention.

A modular door trim panel assembly of the present invention is generally indicated at 10 in the figures, where like numbers are used to designate like structure throughout. As shown in FIG. 1, the modular door trim panel assembly 10 is employed within a vehicle, generally indicated at 12 having an interior, generally indicated at 14. Specifically, the modular door trim panel assembly 10 is shown mounted to a driver's side door, generally indicated at 16. The door 16 includes a frame 18 having a first surface 20 facing the interior 14 of a vehicle 12 and a second surface 22 opposite the first surface 20. The door frame 18 is adapted to be pivotally mounted to the vehicle body, generally indicated at 24, to permit ingress and egress to and from the interior 14 of a vehicle 12. The door 16 further includes other components such as a window 26, side mirror panel 28 for covering the side rear view mirror mounts (not shown).

While the modular door trim panel assembly 10 of the present invention is shown for use in connection with a driver's side vehicle door 16, those having ordinary skill in the art will appreciate that it may be mounted to any vehicle door. By way of example, the trim panel assembly 10 of the present invention may be mounted to a passenger side door or a hatchback door. Further, the door trim panel assembly 10 may also be molded to any predetermined shape to accommodate adjacent components of the vehicle 12, such as the window 26 or side mirror panel 28.

Referring to FIG. 1, the modular door trim panel assembly 10 of the present invention includes a plurality of trim panel components generally indicated at 30, each having a surface that is visible from the interior 14 of a vehicle 12. The trim panel components 30 of the trim panel assembly 10 of the present invention, as illustrated throughout the figures, include a door latch assembly 32 to facilitate ingress and egress to and from the vehicle interior 14, a map pocket 34 to retain various articles such as maps, compact discs and other articles, a bolster 36 to provide a soft-touch area within the door trim panel assembly 10, an armrest 38 to improve the ergonomic quality of the interior 14, and a window control 40 to facilitate movement of the window 26 of the vehicle door 16. Those having ordinary skill in the art will appreciate that the modular door trim panel assembly 10 of the present invention may include any number of other components such as a speaker cover, cup holder, etc as well as fewer components, depending on the intended styling of the interior 14 of a vehicle 12.

The modular door trim panel assembly 10 of the present invention further includes a molded substrate, generally indicated at 42. The molded substrate 42 includes a first side 44 that defines an A-side surface 46 visible from the interior 14 of an automotive vehicle 12 and a second side 48 opposite the first side 44 that defines a B-side surface 50 adjacent the first surface 20 of the vehicle door 16. The A-side surface 46 may incorporate a pattern or texture, such as the grain of leather, to improve the aesthetic quality of the vehicle interior 14. The molded substrate 42 provides a surface upon which the trim panel components 30 may be mounted. Specifically, the molded substrate 42 includes at least one aperture 52 through which a trim panel component 30 is placed and then mounted to the B-side surface 50 via any known method such as sonic welding, heat stacking, or other method of attachment that conceals the bond area from visibility on the A-side surface 46, thereby maintaining the aesthetic quality of the vehicle interior 14. Accordingly, the number of apertures 52 within the substrate 42 may correspond to the number of trim panel components 30 that require mounting along the B-side surface 50.

Figure 2:
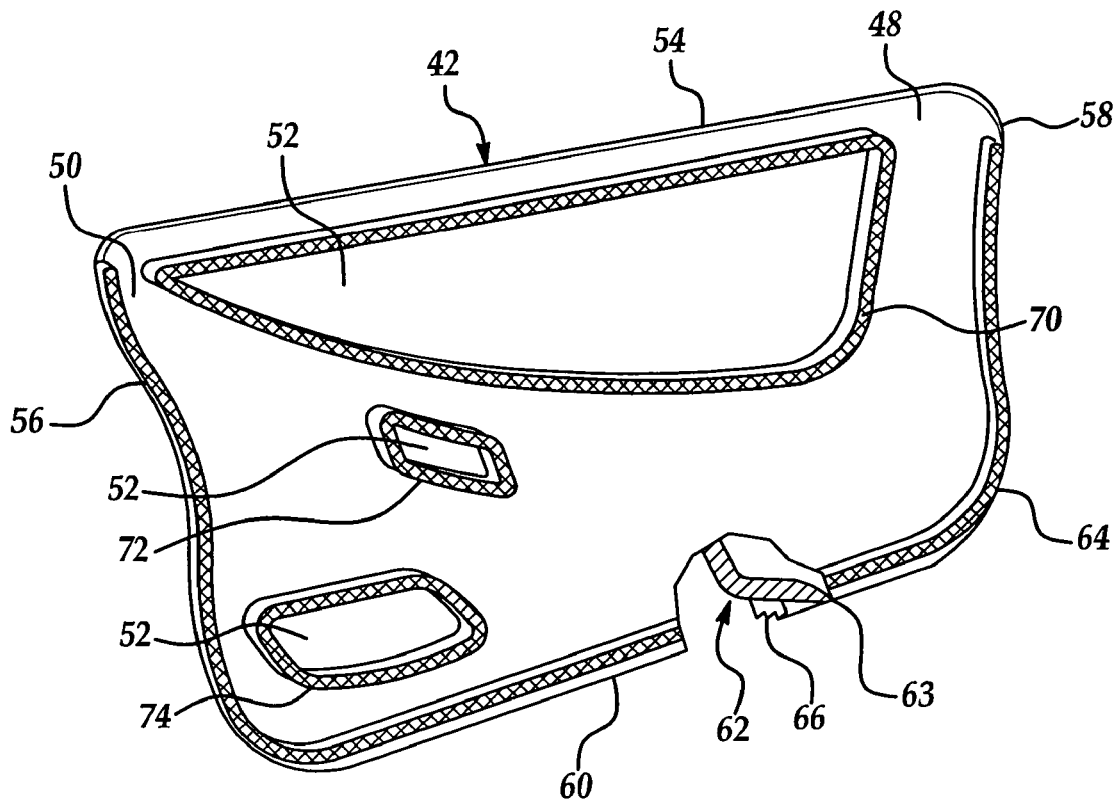
FIG. 2 is a perspective view of the B-side of the molded substrate of the present invention.

The molded substrate is further defined by a plurality of terminal edges, namely a top terminal edge 54 adjacent a window 26, a pair of side terminal edges 56, 58 depending from the top terminal edge 54, and a lower terminal edge 60 extending between the side terminal edges 56, 58. The terminal edges 54, 56, 58, 60 may be formed to include any predetermined shape to improve the aesthetic or ergonomic quality of the vehicle interior 14. By way of example one side terminal edge 56 includes a curvature to accommodate an armrest 38 within the trim panel assembly 10. As shown in FIGS. 2–3, the terminal edges 56, 58, 60 include a predetermined contour, generally indicated at 62. The contour 62 includes a touchdown area 63 adjacent the vehicle door 16 and is typically employed to conceal the B-side surface 50 of the molded substrate 42 from the interior 14 of a vehicle 12, as commonly known in the art. However, for improved aesthetic quality of the interior 14 of a vehicle 12, it is preferred that the foot height and foot width of the contour 62 be as small as possible to provide the least amount of visibility on the A-side surface 46 as possible.

Referring to FIGS. 2–4C, the trim panel assembly of the present invention further includes at least one seal 64 along the B-side surface 50 of the substrate 42 that is co-molded with the molded substrate 42 in a manner that will be described in greater detail below. The seal 64 is bonded to the B-side surface 50 of the substrate and extends substantially parallel to the side terminal edges 56, 58 and the lower terminal edge 60 to prevent moisture between the vehicle door 16 and the B-side surface 50 of the molded substrate 42 from entering the interior 14 of a vehicle 12. Referring to FIGS. 3 and 4B, the seal 64 extends from the B-side surface 50 and contacts the first surface 20 of the door 16. The predetermined contour 62 facilitates the contact between the seal 64 and the door frame 18. Additionally, the seal 64 imparts a flexible quality when cured to accommodate for any irregularities along the contact point between molded substrate 42 and the first surface 20 of the door frame 18. As shown in FIG. 3, the seal 64 includes a serrated edge 66 that contacts a predetermined area of the vehicle door 16. However, those having ordinary skill in the art will appreciate that the seal 64 may include any shape and need not be serrated.

Referring to FIGS. 2 and 4C, the trim panel assembly 10 of the present invention further includes at least one other seal, generally indicated at 68, to prevent the entry of moisture between the B-side surface 50 of the substrate 42 and the vehicle door 16. Specifically, the trim panel assembly 10 includes three additional seals 70, 72, 74. Each of the additional seals 70, 72, 74 substantially extend around each of the trim panel components 30, namely the bolster 36, door latch assembly 32 and map pocket 34. Those having ordinary skill in the art will appreciate that the door trim panel assembly 10 of the present invention may include any number of additional seals 68 and that the number of additional seals 68 need not correspond to the number of trim panel components 30. By way of example, one additional seal may extend around more than one trim panel component. Through the combination of a seal 64 around the sides and lower terminal edges 56, 58, 60 and a molded substrate 42 as well as providing a seal 68 around any aperture 52 within the substrate 42, the trim panel assembly 10 of the present invention eliminates the need for a separate vapor barrier substrate within the vehicle door 18 to prevent moisture from entering the interior 14 of the vehicle 12.

As noted above, the seal 64 is co-molded from the injection of a second molten thermoplastic material into a mold cavity while the molded substrate 42 is formed. Those having ordinary skill in the art will appreciate that co-molding the seal 64 while the substrate 42 is formed reduces costs associated with purchasing pre-formed seals as well as costs associated with secondary handling of the 42 substrate and assembly of the pre-formed seal thereto. Furthermore, by co-molding a seal 64 while the substrate 42 is formed, the predetermined contour 62 visible from the A-side surface 46 adapted to accommodate the seal 64 remains minimal, thereby maintaining a compact profile to improve the aesthetic quality of the vehicle interior 14.

The method of manufacturing the trim panel assembly 10 of the present invention includes forming a rigid substrate 42 via the injection of a molten thermoplastic material into a mold, generally indicated at 76, having a mold cavity 78. Referring to FIGS. 4A–4C, a first rigid-forming molten thermoplastic material is injected into a mold cavity 78 having an actuated core 80. When actuated, the core partitions a portion of the mold cavity 78 so as to prevent the first thermoplastic material form completely filling the mold cavity 78. The first thermoplastic material may include any rigid forming material commonly known in the related art and suitable for use in modular trim panel applications. By way of example the material employed may include nylon, polypropylene, acrylonitrile butadiene styrene (ABS), polyvinyl chloride (PVC) or thermoplastic olefin (TPO) or other rigid forming material. While the first molten thermoplastic material forms the rigid substrate 42 in the mold cavity 78 and following the lapse of a predetermined amount of time, that depends on the molten thermoplastic material used and mold process conditions, the core 80 is retracted to define a secondary void 82 within the mold cavity 78. A second molten thermoplastic material is then injected into the secondary void 82 of the mold cavity 78 while the rigid substrate 42 remains tacky. The second molten thermoplastic material has a flexible quality when cured and is bonded to the B-side surface 50 of the substrate 42. Specifically, the second thermoplastic material is bonded to the B-side surface 50 of the substrate 42 along the side terminal edges 56, 58 and the lower terminal edge 60 to form a flexible seal 64 to prevent the entry of moisture between the B-side surface 50 of the substrate 42. Where modular door trim panel assembly 10 of the present invention includes at least one trim panel component 30, the second molten thermoplastic material is injected into a number of secondary voids 82 to co-mold at least one other integrated seal 68 to provide a seal 68 around the aperture(s) 52 that accommodate the trim panel component(s) 30. Those having ordinary skill in the art will appreciate that any material adapted for use in an injection mold that provides the desired flexible quality may be employed for use as the second thermoplastic material.

The present invention provides a modular door trim panel assembly 10 having an integrated seal 64 co-molded while the door trim panel substrate 42 is formed in a mold 76. Accordingly, the present invention reduces steps in manufacturing a modular door trim panel assembly 10. The modular door trim panel assembly 10 of the present invention includes a substrate 42 adapted to receive trim panel components 30, thereby substantially reducing the need for a carrier substrate on which the door trim components 30 are traditionally mounted. Further, the modular door trim panel assembly 10 of the present invention provides a co-molded integrated seal 64 that eliminates the need for a separate vapor barrier to prevent moisture within the vehicle door 16 from entering the interior 14 of the vehicle 12. Still further, the co-molded integrated seal 64 reduces the visibility of the contour 62 that accommodates a seal 64 along the A-side 46 of a modular vehicle door trim panel 42, thereby improving the aesthetic quality of the trim panel assembly 10. Still further, the present invention provides a method of manufacturing a modular door trim panel assembly 10 having an integrated seal 64 that reduces costs associated with assembly by eliminating the need for a pre-formed seal.

The present invention has been described in an illustrative manner. It is to be understood that the terminology that has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. A modular door trim panel assembly comprising:
   a molded substrate having a first side defining an A-side surface that is visible from the interior of an automotive vehicle and a second side opposite said first side that defines a B-side surface adjacent a vehicle door, said substrate including at least one aperture adapted to receive a door trim panel component, a pair of side terminal edges and a lower terminal edge extending therebetween;
   at least one seal that is co-molded while said substrate is formed and bonded to said B-side of said substrate, said seal extending substantially parallel to said pair of side terminal edges and said lower terminal edge of said substrate and adapted to prevent the entry of moisture between said B-side of said substrate and the vehicle door, and
   wherein said seal is made of a polymer material suitable for use within an injection mold that maintains a flexible quality when cured.

2. A modular door trim panel assembly as set forth in claim 1 wherein said seal extends from said B-side surface to a vehicle door to sealingly contact a predetermined area of the vehicle door.

3. A modular door trim panel assembly as set forth in claim 2 wherein a portion of said pair of side terminal edges and said lower terminal edge are contoured to receive said seal and facilitate contact between said seal and the vehicle door.

4. A modular door trim panel assembly as set forth in claim 1 further includes at least one door trim panel component disposed within said aperture and mounted to said molded substrate, said door trim panel component having at least one surface visible from the interior of an automotive vehicle.

5. A modular door trim panel assembly as set forth in claim 1 further includes a second seal that is co-molded while said substrate is formed and bonded to said B-side of said substrate, said second seal extending substantially around said aperture and adapted to prevent the entry of moisture between said B-side of said substrate and the vehicle door through said aperture.

6. A modular door trim panel assembly as set forth in claim 5 wherein said second seal extends from said B-side surface to a vehicle door to sealingly contact a predetermined area of the vehicle door adjacent said aperture.

7. A modular door trim panel assembly as set forth in claim 5 wherein said second seal is made of a polymer material suitable for use within an injection mold that maintains a flexible quality when cured.

8. A vehicle door assembly comprising:
   a door frame adapted to be pivotally mounted to an automotive vehicle body, said door frame having a first surface facing the interior of an automotive vehicle and a second surface opposite said first surface;
   a modular door trim panel secured to said first surface of said door frame, said modular door trim panel including a molded substrate having a first side defining an A-side surface that is visible from the interior of an automotive vehicle and a second side opposite said first side that defines a B-side surface adjacent said first surface of said door frame, said substrate including at least one aperture adapted to receive a door trim panel component, a pair of side terminal edges and a lower terminal edge extending therebetween, said modular door further including at least one seal that is co-molded while said substrate is formed and bonded to said B-side of said substrate, said seal extending substantially parallel to said pair of side terminal edges and said lower terminal edge of said substrate and adapted to prevent the entry of moisture between said B-side of said substrate and said door frame, and
   wherein said seal is made of a polymer material suitable for use within an injection mold that maintains a flexible quality when cured.

9. A vehicle door assembly as set forth in claim 8 wherein said seal extends from said B-side surface to said door frame to sealingly contact said first surface of said door frame.

10. A vehicle door assembly as set forth in claim 8 wherein a portion of said pair of side terminal edges and said lower terminal edge are contoured to receive said seal and facilitate contact between said seal and said first surface of said door frame.

11. A vehicle door assembly as set forth in claim 8 further includes at least one door trim panel component disposed within said aperture and mounted to said substrate, said door trim panel component having at least one surface visible from the interior of an automotive vehicle.

12. A vehicle door assembly as set forth in claim 8 further includes a second seal that is co-molded while said substrate is formed and bonded to said B-side of said substrate, said second seal extending substantially around said aperture and adapted to prevent the entry of moisture between said B-side of said substrate and said door frame through said aperture.

13. A vehicle door assembly as set forth in claim 12 wherein said second seal extends from said B-side surface to said door frame to sealingly contact said first surface of said door frame adjacent said aperture.

14. A vehicle door assembly as set forth in claim 12 wherein said second seal is made of a polymer material suitable for use within an injection mold that maintains a flexible quality when cured.

* * * * *